United States Patent
Lutz

(10) Patent No.: US 7,090,064 B2
(45) Date of Patent: Aug. 15, 2006

(54) AUXILIARY CONVEYOR WITH ADJUSTABLE TRAYS

(76) Inventor: David W. Lutz, 1223 Dickenson Dr., Carlisle, PA (US) 17013

( * ) Notice: Subject to any disclaimer, the term of this patent is extended or adjusted under 35 U.S.C. 154(b) by 0 days.

(21) Appl. No.: 10/874,688

(22) Filed: Jun. 23, 2004

(65) Prior Publication Data
US 2005/0115809 A1    Jun. 2, 2005

Related U.S. Application Data

(60) Provisional application No. 60/565,200, filed on Apr. 23, 2004, provisional application No. 60/525,956, filed on Dec. 1, 2003.

(51) Int. Cl.
B65G 13/00    (2006.01)
(52) U.S. Cl. .............................. 193/35 R; 193/35 TE; 198/861.1
(58) Field of Classification Search .............. 193/35 R, 193/35 TE; 198/861.1, 812, 594
See application file for complete search history.

(56) References Cited

U.S. PATENT DOCUMENTS 2,613,789 A * 10/1952 McLaughlin ............ 193/35 TE
3,263,951 A * 8/1966 Stokes ........................ 248/172
4,852,712 A * 8/1989 Best ........................ 193/35 TE
5,078,250 A * 1/1992 Cole ........................ 193/35 R
5,474,412 A * 12/1995 Pfeiffer et al. .............. 414/276
5,951,228 A * 9/1999 Pfeiffer et al. .............. 414/276
6,068,111 A * 5/2000 Smith et al. ................. 198/812
6,073,743 A * 6/2000 Mefford .................... 193/35 R
6,675,946 B1 * 1/2004 Lutz ...................... 193/35 TE

* cited by examiner

Primary Examiner—Gene C. Crawford
Assistant Examiner—Rashmi Sharma
(74) Attorney, Agent, or Firm—The Webb Law Firm

(57) ABSTRACT

A conveyor includes a frame having a plurality of upstanding legs. At least one tray unit is carried on the frame. The tray unit includes at least one connector element. The conveyor further includes at least one clip connectable to the frame and having at least one attachment element configured to releasably engage the connector element of the tray. The connector elements can be spaced holes located along the sides of the tray unit. The attachment element can be a projection or tooth on the tray clip configured to selectively engage one or more of the holes on the side of the tray unit. The clip can include a locking arm to lock the tray to the clip to prevent the tray from sliding during use. The width of the frame and/or the tray unit can be adjusted.

20 Claims, 5 Drawing Sheets

AUXILIARY CONVEYOR WITH ADJUSTABLE TRAYS

CROSS REFERENCE TO RELATED APPLICATIONS

This application claims the benefits of U.S. patent application Ser. No. 60/525,956 filed Dec. 1, 2003 and Ser. No. 60/565,200 filed Apr. 23, 2004, both of which applications are herein incorporated by reference in their entirety.

BACKGROUND OF THE INVENTION

1. Field of the Invention

This invention relates generally to conveyor systems and, more particularly, to gravity auxiliary conveyors for transporting containers, such as industrial totes and boxes.

2. Technical Considerations

In many industrial applications, individual parts or components are delivered to a worker at a designated workstation for incorporation into a product. Typically, these parts are delivered in containers or totes. The worker must pick parts from the totes and then attach or incorporate the parts into the product being manufactured. When a tote is empty, it is removed from the workstation to make room for a new tote filled with more parts.

In the past, the totes containing the parts have been placed on the floor at the workstation and the worker had to bend over to pick the parts out of the tote. This can be uncomfortable for the worker to repetitively bend over and straighten up to retrieve the parts from the tote and then attach them to the product. In order to address this problem, auxiliary conveyor systems have been developed which allow the tote to be placed above the floor and at a more convenient angle for the worker to retrieve the parts. One adjustable auxiliary conveyor is disclosed in U.S. Pat. No. 6,675,946, herein incorporated by reference in its entirety. This auxiliary conveyor allows totes containing the parts to be provided to the worker on one shelf and then the empty totes can be placed on another shelf and returned to the rear of the auxiliary conveyor. This known auxiliary conveyor increases the efficiency of the worker and also reduces physical stress.

While this known auxiliary conveyor is excellent for its intended purpose, improvements could be made to increase the usefulness of the auxiliary conveyor as well as the ease of adjusting the shelf position of the auxiliary conveyor.

Therefore, it would be advantageous to provide an auxiliary conveyor which further improves the versatility of known auxiliary conveyors without adversely complicating the mechanical structure of the conveyor.

SUMMARY OF THE INVENTION

An exemplary auxiliary conveyor of the invention includes a frame having a plurality of upstanding legs. At least one shelf formed by a tray unit is carried on the frame. The tray unit includes at least one connector element. The conveyor further includes at least one tray clip connectable to the frame and having at least one attachment element configured to releasably engage the connector element of the tray. In one particular embodiment, the tray unit connector elements are in the form of spaced holes located along the sides of the tray unit. The tray clip attachment element can be a projection or tooth on the tray clip configured to selectively engage one or more of the holes on the side of the tray unit. The tray clip can include a locking device to lock the tray unit to the tray clip to prevent the tray unit from sliding during use. The tray clip and tray unit can be configured to move from a first configuration in which the attachment element of the clip engages the connector element on the tray unit to secure the tray unit to the clip, to a second configuration in which the tray unit can be engaged or disengaged from the tray clip. The tray clip and tray unit can also be movable to a third configuration in which the tray unit can slide on or along at least a portion of the clip such that the fore and aft position of the tray unit is adjustable. The height of the clip on the frame can be adjusted such that the height of the tray unit and/or the angle of the tray unit on the frame are adjustable. Moreover, the width of the frame and/or the tray unit can be adjustable to accommodate different sized totes.

The tray clip also allows for quick and easy fore and aft adjustment of the tray unit on the frame. In one specific embodiment, the tray unit includes a tray frame with a plurality of engagement members, such as upstanding tabs or teeth. One or more roller assemblies can be carried in the tray unit with the roller assemblies held in position between two adjacent tabs. Additionally, the tray unit can include one or more lane dividers. For example, the lane dividers can be rectangular or elongated metal dividers with one or more receiving elements configured to receive or engage one or more of the engagement members of the tray unit to hold the lane dividers in place. The width of the lanes on the tray unit can be adjusted by moving the roller assemblies and/or lane dividers on the tray unit.

BRIEF DESCRIPTION OF THE DRAWINGS

Exemplary embodiments of the invention will now be described with reference to the attached drawing figures in which like reference numbers refer to like parts throughout.

DESCRIPTION OF THE PREFERRED EMBODIMENTS

Figure 1:
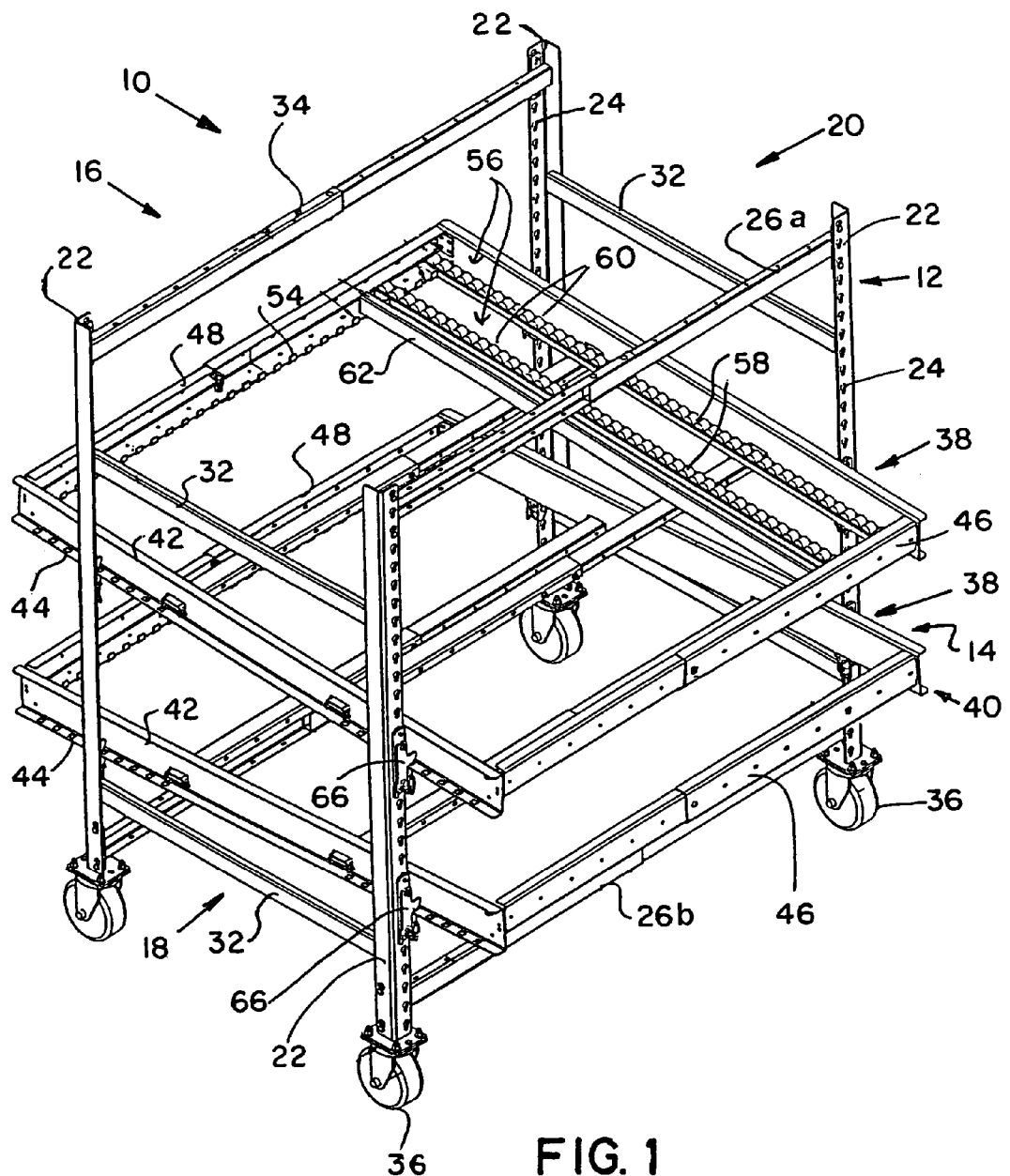
FIG. 1 is a perspective view of an auxiliary conveyor of the invention.

As used herein, spatial or directional terms, such as "top", "bottom", "left", "right", "up", "down", "front", "rear", "fore", "aft", "width", "length", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 7.3, 5.5 to 10, 8.2 to 9.7, and the like.

The structural components of an exemplary auxiliary gravity conveyor incorporating features of the invention will first be described and then the use of the conveyor to practice an exemplary method of the invention will be described. However, it is to be understood that the specifically disclosed conveyor and method are presented simply to explain the general concepts of the invention and that the invention is not limited to these specific embodiments.

Figure 2:
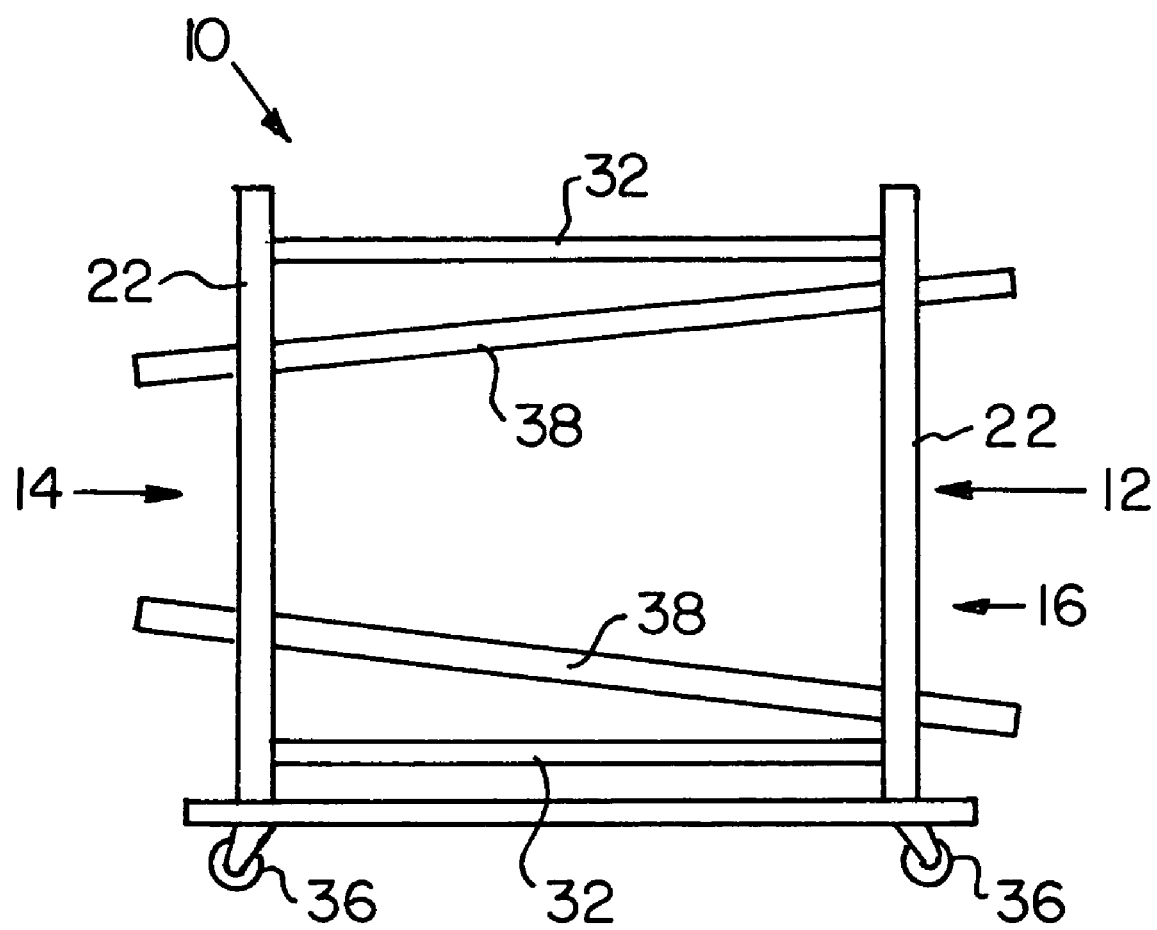
FIG. 2 is a side view of an auxiliary conveyor of the invention.
Figure 3:
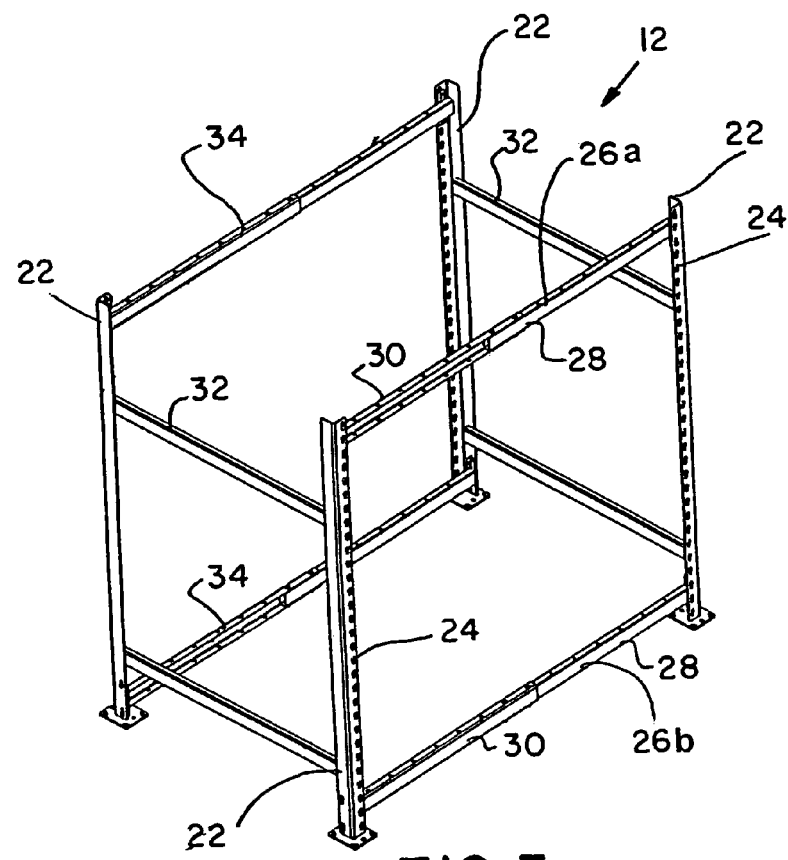
FIG. 3 is a perspective view of an auxiliary conveyor frame of the invention.

As shown particularly in FIGS. 1–3, an exemplary auxiliary gravity conveyor 10 of the invention includes a frame 12. For purposes of the following discussion, the exemplary conveyor 10 and frame 12 will be described as having a front 14, a rear 16, a left side 18, and a right side 20. However, it is to be understood that these directional terms are only for explanation purposes with respect to the illustrated embodiment and such terms are not to be considered as limiting to the invention.

As shown in FIGS. 1–3, the frame 12 has a plurality of supports or legs 22 which can be made of rigid material, such as but not limited to plastic or metal, e.g., aluminum, steel, etc. In the exemplary embodiment, the legs 22 can be substantially L-shaped in cross section and can have a first part or side extending at a substantially right angle to a second part or side. A plurality of spaced connectors 24 can be carried on or formed on the legs 22. For example, in the illustrated embodiment, the connectors 24 are configured as eye-slots having a larger diameter area adjacent a smaller diameter area (such eye-slots are described in U.S. Pat. No. 6,675,946). However, any suitable conventional connector system, e.g., bolt holes, hooks, bayonet mounts, etc., could be used. The legs 22 can be made of a single piece of material, e.g., a single metal log. Or, if desired, the legs 22 can be extensible and retractable. For example, the legs 22 can be formed by two or more telescoping or mutually slidable pieces that can be selectively locked in any conventional manner to adjust the length of the legs 22 and thus the height of the frame 12. This locking can be done in any conventional manner, such as but not limited to pins or bolts passing through aligned holes in the leg pieces, friction clamps, screws, etc.

One or more front support beams 26 can extend between the left and right front legs 22. In the illustrated embodiment, a first or upper support beam 26a is located above a second or lower support beam 26b. For example, the support beams 26a and 26b can be permanently attached to the left and right front legs 22, such as by welding. Alternatively, the support beams 26a and 26b can include engagement elements to releasably connect the support beams 26a, 26b to the legs 22, such as by engaging one or more of the connectors 24. For example but not limiting to the invention, the engagement elements can be configured as projections or posts extending from the support beams 26a, 26b and having a larger diameter outer head configured to releasably engage the eye-holes on the legs 22. In the illustrated embodiment, the support beams 26a, 26b can be extensible and retractable, e.g., telescopic, so that they are adjustable or movable between a first, retracted position and one or more second, elongated or expanded positions such that width of the frame 12, and thus the width of the conveyor 10, is adjustable. In the illustrated embodiment, the support beams 26a, 26b are formed by a first beam member 28 that is slidable along or in a second beam member 30. The relative positions of the beam members 28, 30 can be fixed by any conventional locking device, such as pins, bolts, screws, etc., such that the length of the support beams 26a, 26b is selectively adjustable which, in turn, provides for the width of the conveyor 10 to be selectively adjustable.

As also shown in FIGS. 1–3, one or more side beams 32 can extend between the forward and rear legs 22 on a side of the conveyor 10 to add additional support to the frame 12. These side beams 32 can be of similar construction to the front beams 26 and can either be permanently attached to the legs 22 or can be releasably engaged to the legs 22 as described above with respect to the front beams 26. The side beams 32 can be of fixed length or the side beams 32 can be of adjustable length as described above with respect to the front beams 26 such that the depth of the conveyor 10 can be adjustable. In the illustrated embodiment, a first or upper side beam 32a is positioned above a second or lower side beam 32b.

One or more rear support beams 34 can be connected to, i.e., extend between, the rear legs 22. These rear support beams 34 can be of similar construction to the front support beams 26 described above. For example, the rear support beams 34 can be of fixed length or can be of adjustable length.

As shown in FIG. 1, the frame 12 can be mounted on wheels or casters 36 so that the conveyor 10 can be moved from one location to another. The casters 36 can have a conventional locking or braking device which can be engaged to prevent movement when the conveyor 10 is at a desired location.

Figure 4:
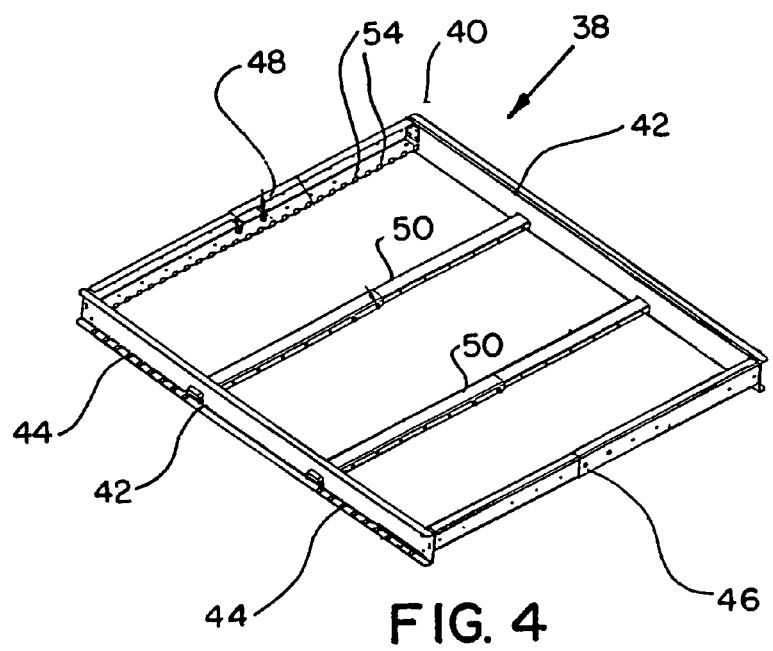
FIG. 4 is a perspective view of a tray unit of the invention.

As shown in FIGS. 1, 2, and 4, at least one shelf formed by at least one tray unit 38 can be carried on the frame 12. The tray unit 38 includes a tray frame 40 which, in the illustrated exemplary embodiment, is substantially rectangular. The exemplary tray frame 40 can be formed by two spaced side rails 42. The side rails 42 can have one or more connector elements 44. In the illustrated embodiment, the connector elements 44 are configured as slots or holes that can engage tray clips described in more detail below. A front tray beam 46 and a rear tray beam 48 can be connected to and/or extend between the side rails 42. One or more inner support rails 50 can be located between the front and rear tray beams 46, 48.

The tray beams 46, 48 and/or side rails 42 and/or support rails 50 can be of fixed length or can be of adjustable length such that the width and/or depth of the tray frame 40 can be adjustable. For example, in the illustrated embodiment, the side rails 42 are of fixed length but the front and rear tray beams 46, 48 and support rails 50 are formed by extensible and retractable, e.g., telescopic, members as described above for the support beams 26. Thus, in this illustrated embodiment, the width of the tray unit 38 can be adjusted by adjusting the lengths of the tray beams 46, 48 and support beams 50. The frame 12 can be similarly adjusted in width by adjusting the lengths of the front beams 26 and rear beams 34 to accommodate the new tray width.

In another embodiment, the length of the tray unit 38 can be adjusted by adding or attaching an extension piece onto one or both ends of the side rails 42. For example, the front tray beam 46 can be disconnected from the side rails 42 and extension pieces attached to the left front side rail 42 and right front side rail 42. The extension pieces can be rigid, e.g., metal, pieces of the same or similar dimensions as the side rails 42, thus, essentially increasing the length of the side rails 42. The front beam 46 can then be attached to the extension pieces to increase the effective length of the tray unit 38.

As shown in FIGS. 1 and 4, the tray unit 38 can include a plurality of engagement members 54 spaced from one another, e.g., along an inner edge of the front and rear tray beams 46, 48 of the tray frame 40. In the specifically disclosed example, the engagement members 54 are configured as upwardly projecting teeth or tabs. One or more roller assemblies 56 can be removably positioned in the tray unit 38. The roller assemblies 56 can include one or more rollers 58 held in an elongated roller framework 60. As shown in FIG. 1, the roller assemblies 56 can be positioned between adjacent tabs such that the tabs prevent the roller assemblies 56 from sliding left or right in the tray unit 38. This maintains the roller assemblies 56 in a desired position in the tray unit 38. Additionally, as also shown in FIG. 1, one or more lane dividers 62 can be carried on the tray unit 38. The lane dividers 62 can extend above the level of the rollers 58. The lane dividers 62 can be, for example, elongated metal dividers having receiving elements, such as slots or holes, to engage the engagement members 54, e.g., tabs, of the tray unit 38 to hold the lane dividers 62 in place. For example, the receiving elements can be formed by flanges extending from the ends of the lane dividers and having one or more slots configured to engage the tabs on the tray unit. As will be described in more detail below, the number and position of roller assemblies 56 and lane dividers 62 can be adjusted so that a desired width of a conveyor lane can be selectively adjusted by an operator by moving the lane dividers 62 and roller assemblies 56. The roller assemblies 56 and/or lane dividers 62 can rest on or contact the upper surface of the support rails 50.

Figure 5:
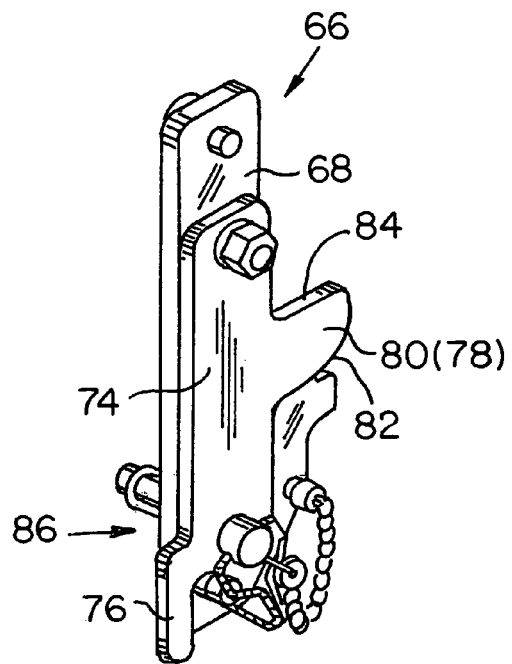
FIGS. 5 and 6 are front and rear views, respectively, of an exemplary tray clip of the invention.
Figure 6:
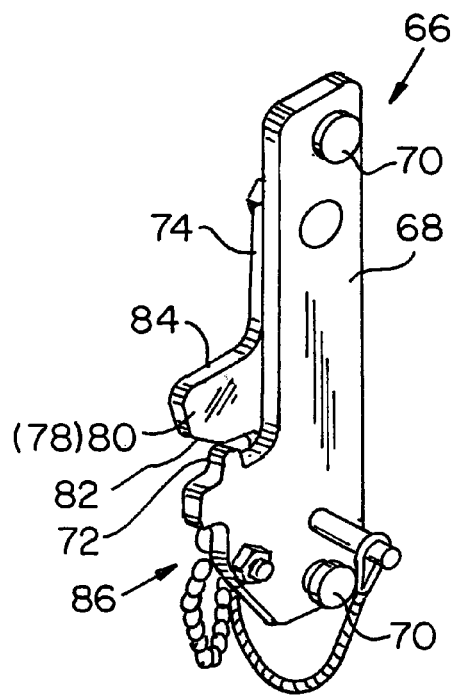

As shown in FIGS. 1, 5, and 6, the conveyor 10 includes tray clips 66 configured to hold the tray units 38 on the frame 12. In the embodiment shown in FIGS. 5 and 6, the tray clip 66 includes a first portion or base 68 having one or more attachment devices 70 to releasably attach the base 68 to the frame 12, e.g., at a desired position on a leg 22. For example but not limiting to the invention, the attachment devices 70 can be configured as one or more posts having an enlarged head configured to engage the eye-slots on the legs 22. Thus, as will be understood from FIGS. 1, 5, and 6, the height of the tray clip 66 on a leg 22 can be adjusted by moving the tray clip 66 from one set of eye-slots to another along the leg 22. However, it is to be understood that any conventional attachment device could be used, such as but not limited to clips, bolts, snaps, etc.

The tray clip 66, e.g., the base 68, further includes an attachment element 72 connected to or extending from the base 68 and configured to engage the connector elements 44 (e.g., slots) on the tray unit 38. In the illustrated embodiment, the attachment element 72 is configured as a projection or tooth on the tray clip 66 (e.g., on the base 68) which is configured to selectively and releasably engage the slots on the side of the tray unit 38 as described in more detail below.

The tray clip 66 further includes a locking mechanism which can be used to lock the tray unit 38 to the tray clip 66 when the attachment element 72 (projection) has engaged one of the holes on the tray unit 38. The locking mechanism can be, for example, a movable locking arm 74 as described below. However, any conventional locking mechanism could be used, such as but not limited to screw clamps, bolts, screws, and the like.

As will be described in more detail below, the clip 66 can also be used to allow the position, e.g., fore and aft position, of the tray unit 38 to be adjusted easily and conveniently. In the illustrated embodiment of FIGS. 5 and 6, the locking arm 74 is pivotally connected to the base 68 and includes a handle 76 and a locking member 78. In the illustrated exemplary embodiment, the locking member 78 is configured as a projection 80 extending from the locking device 74 and having a curved lower portion 82 and a relatively flat or planar top portion 84. The clip 66 can also include a clip lock 86 to prevent pivotal movement of the locking arm 74. The clip lock 86 can be, for example, a pin that can be inserted through aligned holes in the base 68 and locking arm 74.

Figure 7:
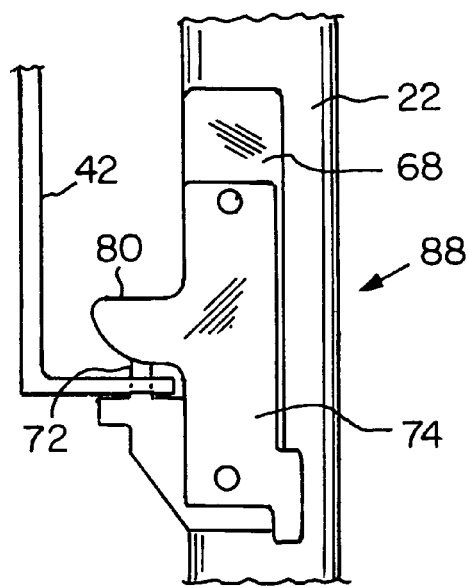
FIGS. 7 and 8 show a second exemplary tray clip of the invention.
Figure 8:
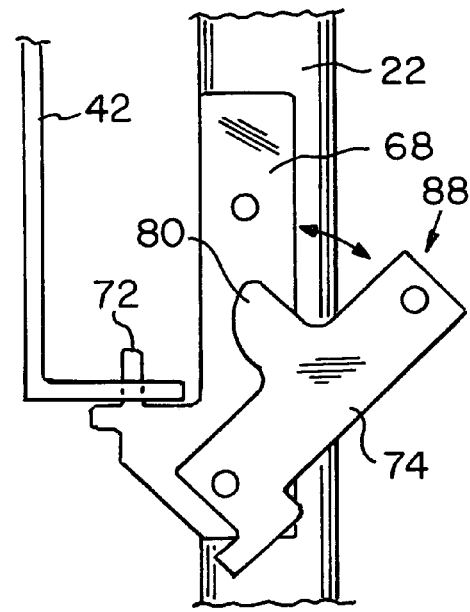

An alternative tray clip 88 is shown in FIGS. 7 and 8. The tray clip 88 operates in similar manner to the tray clip 66 but the bottom of the locking arm 74 of the clip 88 is pivotally connected to the base 68 rather than the top of the locking arm as in clip 66.

Operation of the conveyor 10 will now be described utilizing the tray clip 66.

The tray clips 66 can be attached to the legs 22 at a desired position, e.g., height, to accommodate one or more tray units 38. As shown in FIGS. 1 and 2, one or more sets of tray clips 66 can be attached to the legs 22 such that one or more of the tray units 38 is inclined towards the front 14 of the conveyor 10 (i.e., such that containers placed on the rear of this tray unit 38 will slide forward toward the front of the tray unit 38). One or more other sets of tray clips 66 can be placed such that one or more of the tray units 38 slope rearwardly (i.e., such that containers placed on the front of the tray unit 38 will slide toward the rear of the tray unit 38). In FIGS. 1 and 2, the upper tray unit 38 is sloped forwardly and the lower tray unit 38 is sloped rearwardly.

Figure 9:
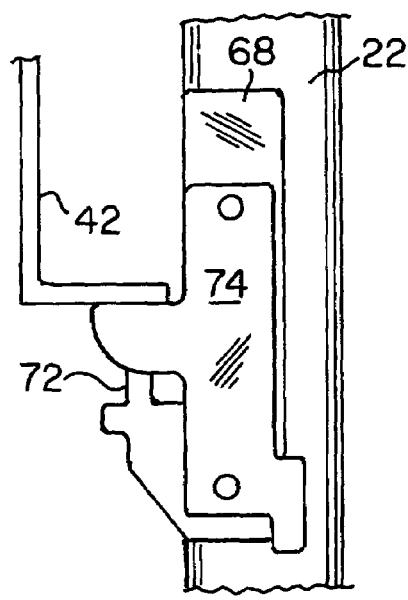
FIGS. 9–11 show the tray clip of FIGS. 5 and 6 attached to a frame.
Figure 10:
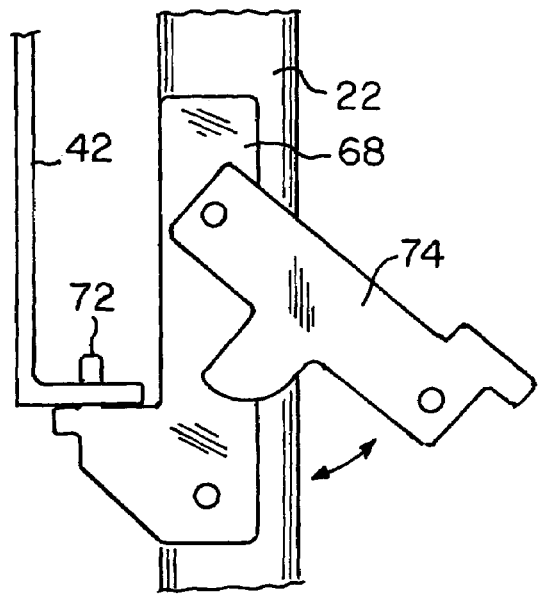
Figure 11:
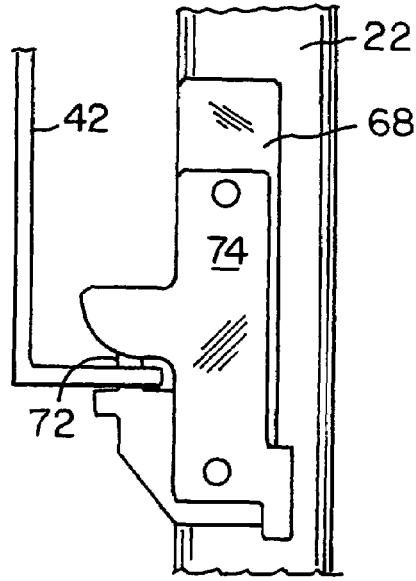

With the tray clips 66 attached to the legs 22 at desired positions, the individual tray units 38 can then be connected to the frame 12. For example, a tray unit 38 can be positioned above a set of tray clips 66 with the tray clips 66 in closed position, i.e., the locking arm 74 rotated inwardly. In this position, the bottom of the tray unit 38 rests on top of the locking projection 80, i.e., on the flat top portion 84 as shown in FIG. 9. Thus, the forward and aft position of the tray unit 38 in the frame 12 can be adjusted by sliding the tray unit 38 frontwardly or rearwardly on the tray clip 66, e.g., on top of the locking arm 74. When a desired fore and aft position of the tray unit 38 is achieved, the tray unit 38 can be locked in place. For example, an operator can go to each tray clip 66, raise or lift the corner of the tray unit 38 off of the top of the locking arm projection 80, rotate the locking arm 74 outwardly away from the tray unit 38 as shown in FIG. 10 and lower the tray unit 38 until a connector element 44 (e.g., slot) on the tray unit 38 engages the attachment element 72 (e.g., projection) on the tray clip 66. Then, the locking arm 74 can be rotated inwardly toward the tray unit 38 into the locked position shown in FIG. 11 to hold the tray unit 38 in place. The clip lock 86 can be engaged to securely lock the tray unit 38 to the clip 66 at the desired location. In a similar manner, the operator can go to the other corners of the tray unit 38 and lock the tray unit 38 in place. As shown in FIG. 11, when the locking arm 74 is in the closed or locked position, the lower portion 82 of the locking arm projection 80 abuts or is adjacent to the top of the side rail flange carrying the connector elements (slots). Thus, the attachment element 72 on the tray clip 66 engaging the slot 44 on the tray unit 38 prevents fore and aft movement of the tray unit 38 while the locking arm 74 prevents the tray unit 38 from being lifted off of the attachment element 72 of the tray clip 66.

Either after the tray unit 38 has been locked in place or before the tray unit 38 is connected to the frame 12, a desired number of roller assemblies 56 and, optionally, a desired number of lane dividers 62 can be connected to the tray unit 38. For example, one or more roller assemblies 56 can be positioned on the tray unit 38 between the upstanding tabs. To divide the tray unit 38 into a desired number of conveyor lanes, one or more lane dividers 62 can be selectively engaged with the tabs. Thus, the width of individual conveyor lanes can be selected by an operator. Individual conveyor lanes can be of differing width. The lane dividers 62 can extend above the level of the rollers 58 to prevent cartons or totes from one conveyor lane rolling into the adjacent conveyor lane.

If after use or should the size of the parts or containers need to be changed, the width of one or more of the conveyor lanes can be adjusted by disengaging the lane dividers 62 (i.e., lifting the lane dividers 62 to disengage from the tabs), adjusting the position of the roller assemblies 56 by adding or removing roller assemblies 56 or placing adjacent roller assemblies 56 closer or farther apart, and then re-engaging the lane divider 62 with the tray unit 38 by engaging an appropriate number of lane dividers 62 with the upstanding tabs.

The fore and aft position of the tray units 38 in the frame 12 can also be adjusted if desired. For example, to adjust fore and aft positions of a tray unit 38, an operator can go to a tray clip 66 for a particular tray unit 38, rotate the locking arm 74 outwardly to unlock the tray unit 38 at a particular location, lift the tray unit 38 at that position, and rotate the locking arm 74 such that the tray unit 38 rests on top of the smooth top surface 84 of the locking arm projection 80 as described above. The operator can perform this task at each tray clip 66 for the tray unit 38. When completed, the tray unit 38 rests on top of the smooth top surfaces of the locking arm 74 and can, therefore, be easily slid forwardly or rearwardly to adjust the fore and aft position of the tray unit 38 with respect to the frame 12. When a desired position is obtained, the operator can go to each tray clip 66, lift the tray unit 38, rotate the locking arm 74 to the open position, lower the tray unit 38 such that the connector slot on the tray unit 38 engages the tooth on the tray clip 66, and then rotate the locking arm 74 back to the locked position to lock the tray unit 38 in position. Thus, one or more of the tray units 38 can be adjusted forward or aft of other tray units 38. This allows the operator easier access to containers on the tray unit 38 that is in a more forward position since these containers would not be blocked by the tray unit 38 above.

Additionally, the width of the conveyor 10 and tray unit 38 can be adjusted to increase the number or width of conveyor lanes without disassembling the conveyor 10. For example, the extensible and retractable front support beams 26 and rear support beams 34 of the frame 12 and the extensible and retractable front tray beam 46, rear tray beam 48, and support rails 50 can be unlocked to permit the respective members to extend. Then, one or both sides of the conveyor 10 can be pulled apart to increase the width of the frame 12 and simultaneously the tray unit 38. When a desired width has been reached, the front and rear support beams 26 and 34 of the frame 12 and the tray beams 46, 48 and support rails 50 of the tray unit 38 can be locked in place. Additional roller assemblies 56 and/or lane dividers 62 can be added to the tray unit 38. The width of the conveyor 10 can be reduced by reversing the procedure described immediately above.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A conveyor, comprising:
a frame;
at least one tray unit carried on the frame, the tray unit having at least one connector element; and
at least one tray clip connectable to the frame and having at least one attachment element configured to releasably engage the connector element of the tray unit,
wherein the tray clip and/or the tray unit are configured to move from a first configuration in which the tray clip secures the tray unit to the frame when the attachment element engages the connector element, to a second configuration such that the tray unit can be engaged or disengaged from the tray clip.

2. The conveyor of claim 1, wherein the tray clip and/or the tray unit are configured to move to a third configuration in which the tray unit is movable along at least a portion of the tray clip such that a fore and aft position of the tray unit can be adjusted.

3. The conveyor of claim 1, wherein the connector element comprises a plurality of spaced holes located on opposed sides of the tray unit.

4. The conveyor of claim 3, wherein the attachment element comprises a projection on the tray clip configured to selectively engage at least one connector element of the tray unit.

5. The conveyor of claim 1, wherein the tray clip further includes a locking arm pivotally connected to a base.

6. The conveyor of claim 5, wherein the frame includes a plurality of legs and the base includes means to releasably attach the tray clip to the legs.

7. The conveyor of claim 1, wherein the tray unit comprises a tray frame having a plurality of engagement members.

8. The conveyor of claim 7, wherein the engagement members are tabs.

9. The conveyor of claim 7, wherein the tray unit includes one or more roller assemblies releasably connectable to the tray unit.

10. The conveyor of claim 9, wherein the roller assemblies are configured to fit between the engagement members to hold the roller assemblies in place.

11. The conveyor of claim 7, wherein the tray unit further comprises one or more lane dividers, with the lane dividers configured to engage the engagement members of the tray unit to hold the lane dividers in place.

12. The conveyor of claim 1, wherein the frame is adjustable in width and/or length.

13. The conveyor of claim 1, wherein the tray unit is adjustable in width and/or length.

14. A conveyor, comprising:
a frame, wherein the frame is adjustable in width;
at least one tray unit configured to be carried on the frame, wherein the tray unit is adjustable in width and has at least one connector element; and
at least one tray clip connectable to the frame and having at least one attachment element configured to releasably engage the connector element of the tray unit, wherein the frame and tray unit are configured such that the width of the frame and the width of the tray unit can be changed.

15. The conveyor of claim 14, wherein the clip and tray unit are configured to move from a first configuration in which the tray unit is connected to the clip to a second configuration in which the tray unit is movable along at least a portion of the clip such that the fore and aft position of the tray unit is selectively adjustable on the frame.

16. The conveyor of claim 14, wherein the clip is movable on the frame such that the inclination of the tray unit on the frame is selectively adjustable.

17. A conveyor, comprising:
   a frame, wherein the frame is adjustable in width;
   at least one tray unit configured to be carried on the frame, wherein the tray unit comprises a tray frame having at least one connector element and a plurality of spaced tabs, and wherein the tray unit is adjustable in width;
   at least one roller assembly configured to be held in place by the tabs; and
   at least one tray clip configured to hold the tray unit to the frame, wherein the tray clip comprises:
      a base releasably connectable to the frame; and
      at least one attachment element configured to engage at least one connector element of the tray unit.

18. The conveyor of claim 17, wherein the tray clip includes a locking mechanism configured to lock the tray unit to the tray clip and a second position to unlock the tray unit from the tray clip and allow the tray unit to be movable.

19. The conveyor of claim 18, wherein the tray unit is slidable over a top portion of the tray clip.

20. The conveyor of claim 18, wherein the tray clip is movable on the frame such that the inclination of the tray unit is selectively adjustable.

* * * * *